US011857467B2

(12) United States Patent
Beale et al.

(10) Patent No.: US 11,857,467 B2
(45) **Date of Patent: *Jan. 2, 2024**

(54) SURGICAL TABLE AND METHOD FOR USE THEREOF

(71) Applicant: Warsaw Orthopedic, Inc., Warsaw, IN (US)

(72) Inventors: Jeffrey W. Beale, Bartlett, TN (US); Keith E. Miller, Germantown, TN (US); Harold S. Taylor, Memphis, TN (US); Robert Andrew Fields, Memphis, TN (US)

(73) Assignee: WARSAW ORTHOPEDIC, INC., Warsaw, IN (US)

( * ) Notice: Subject to any disclaimer, the term of this patent is extended or adjusted under 35 U.S.C. 154(b) by 225 days.

This patent is subject to a terminal disclaimer.

(21) Appl. No.: 17/162,074

(22) Filed: Jan. 29, 2021

(65) Prior Publication Data

US 2021/0145685 A1 May 20, 2021

Related U.S. Application Data

(63) Continuation of application No. 15/337,157, filed on Oct. 28, 2016, now Pat. No. 10,940,072.

(51) Int. Cl.
*A61G 13/12* (2006.01)
*A61G 13/00* (2006.01)

(52) U.S. Cl.
CPC ....... *A61G 13/1295* (2013.01); *A61G 13/123* (2013.01); *A61G 13/125* (2013.01); *A61G 13/1245* (2013.01); *A61G 13/0054* (2016.11)

(58) Field of Classification Search
CPC .............. A61B 6/0421; A61G 13/0081; A61G 13/1295; A61G 13/123; A61G 13/1245;
(Continued)

(56) References Cited

U.S. PATENT DOCUMENTS 1,011,038 A * 12/1911 Davenport ........... A61G 13/009
606/245
2,691,979 A 10/1954 Watson
(Continued)

FOREIGN PATENT DOCUMENTS

CN 2100875 U 4/1992
CN 201185976 1/2009
(Continued)

OTHER PUBLICATIONS

International Search Report dated Nov. 21, 2016 from International Application No. PCT/US2016/047394.
(Continued)

*Primary Examiner* — Myles A Throop

(57) ABSTRACT

A surgical table includes a sagittal adjustment device for manipulating the position of a patient. The surgical table includes a base portion including an upper surface for spacing the sagittal adjustment device from the ground. The sagittal adjustment device includes a first support portion and a second support portion. The first and second support portions are supported by and moveable over the upper surface of the base portion. The first and second support portions each include an upper surface configured to support portions of the body of the patient thereon. One of the first and second support portions is pivotally attached to the base portion, and moveable between a first position and a second position. The pivotal movement between the first and second positions of the one of the first and second portions serves in repositioning the body of patient to manipulate the spine of the patient.

20 Claims, 6 Drawing Sheets

(58) Field of Classification Search
CPC A61G 13/125; A61G 13/0054; A47C 20/026; A47G 9/1054
USPC .............................. 5/640, 643, 929, 81.1 RP
See application file for complete search history.

(56) References Cited

U.S. PATENT DOCUMENTS 3,060,925 A 10/1962 Honsaker et al.
3,227,440 A 1/1966 Scott
3,293,667 A 12/1966 Ohrberg
3,306,287 A * 2/1967 Arp ...................... A61B 6/0421 5/608
3,620,210 A * 11/1971 Annas ...................... A61H 1/02 601/24
3,828,377 A * 8/1974 Fary, Sr. .............. A47C 20/026 5/639
4,018,322 A * 4/1977 Brown ................. B65G 39/025 193/35 MD
4,029,089 A 6/1977 Mulhlland
4,655,200 A 4/1987 Knight
4,705,026 A 11/1987 Chaussy
4,866,796 A 9/1989 Robinson
4,872,656 A 10/1989 Brendgord
4,901,384 A * 2/1990 Eary .................... A47C 20/021 D6/601
4,915,101 A 4/1990 Cuccia
5,009,407 A * 4/1991 Watanabe .............. A61G 13/00 5/618
5,088,706 A 2/1992 Jackson
5,103,511 A 4/1992 Sequin
5,131,106 A 7/1992 Jackson
5,390,383 A 2/1995 Carn
5,410,769 A * 5/1995 Waterman ............ A61B 6/0421 5/643
5,444,882 A 8/1995 Andrews
5,613,254 A 3/1997 Clayman
5,642,302 A 6/1997 Dumont
D390,958 S * 2/1998 Lathrop ....................... D24/183
5,860,899 A 1/1999 Rassman
5,991,651 A * 11/1999 LaBarbera ................ A61F 5/04 5/624
6,003,176 A * 12/1999 Wasley .................. A61G 13/12 5/624
6,076,525 A 6/2000 Hoffman
6,112,349 A 9/2000 Connolly
6,154,901 A 12/2000 Carr
6,260,220 B1 7/2001 Lamb
6,295,671 B1 10/2001 Reesby et al.
6,298,507 B1 10/2001 Clyburn
6,311,349 B1 * 11/2001 Kazakia ............. A61G 13/0081 5/624
6,367,104 B1 4/2002 Fallbo, Sr. et al.
6,378,149 B1 4/2002 Sanders et al.
6,516,483 B1 2/2003 VanSteenburg
6,566,833 B2 5/2003 Barlett
6,615,430 B2 9/2003 Heimbrock
6,671,905 B2 1/2004 Bartlett et al.
6,681,423 B2 1/2004 Zachrisson
6,701,554 B2 3/2004 Heimbrock
6,701,558 B2 3/2004 VanSteenburg
6,715,169 B2 4/2004 Niederkrom
6,728,983 B2 5/2004 Bartlett et al.
6,732,390 B2 5/2004 Krywiczanin
6,739,006 B2 5/2004 Borders et al.
6,874,181 B1 4/2005 Connolly et al.
6,934,986 B2 8/2005 Krywiczanin et al.
6,941,951 B2 9/2005 Hubert et al.
6,966,081 B1 11/2005 Sharps
7,100,225 B1 * 9/2006 Bailey .................... A61G 13/12 5/632
7,189,214 B1 * 3/2007 Saunders ............. A61H 1/0292 5/618
7,219,379 B2 5/2007 Krywiczanin et al.
7,234,180 B2 6/2007 Horton et al.
7,290,302 B2 11/2007 Sharps
7,415,741 B1 * 8/2008 Wasley .............. A61G 13/0081 5/632
7,426,930 B1 * 9/2008 Bailey .................... A61G 13/12 5/624
7,472,440 B2 1/2009 Bartlett et al.
7,484,253 B1 * 2/2009 Coppens ................ A61G 13/12 5/601
7,496,980 B2 3/2009 Sharps
7,600,281 B2 10/2009 Skripps
7,669,262 B2 3/2010 Skripps
7,739,762 B2 6/2010 Lamb et al.
7,882,583 B2 2/2011 Skripps
8,118,029 B2 2/2012 Gneiting et al.
8,234,730 B2 10/2012 Copeland et al.
8,286,283 B2 10/2012 Copeland et al.
8,286,637 B2 10/2012 Kaska
8,413,660 B2 4/2013 Weinstein et al.
8,439,948 B1 * 5/2013 King .................... A61G 13/009 606/244
8,443,473 B2 5/2013 Maxwell
8,584,281 B2 11/2013 Diel et al.
8,635,725 B2 1/2014 Tannoury et al.
9,072,646 B2 7/2015 Skripps et al.
9,138,063 B1 * 9/2015 Newman .............. A47C 15/008
9,265,680 B2 2/2016 Sharps
9,265,681 B1 2/2016 Bell
9,339,430 B2 5/2016 Jackson et al.
9,358,170 B2 6/2016 Jackson
9,414,982 B2 8/2016 Jackson
9,498,397 B2 11/2016 Hight et al.
9,522,078 B2 12/2016 Pizzini
9,554,959 B2 1/2017 Carn
9,655,793 B2 5/2017 Hertz
9,700,476 B2 7/2017 Hoel et al.
9,713,562 B2 7/2017 Perlman et al.
9,744,089 B2 8/2017 Jackson
9,937,006 B2 4/2018 Skripps et al.
9,993,380 B2 6/2018 Jackson
10,314,758 B2 6/2019 Dolliver et al.
10,342,722 B2 7/2019 Garrido
10,406,054 B1 9/2019 Scholl et al.
10,426,684 B2 * 10/2019 Dubois .............. A61G 13/0054
10,543,142 B2 1/2020 Lim et al.
10,548,796 B2 2/2020 Lim et al.
10,576,006 B2 3/2020 Lim et al.
2003/0140419 A1 7/2003 Barltett et al.
2003/0140420 A1 7/2003 Niederkrom
2003/0145382 A1 8/2003 Krywiczanin
2004/0010849 A1 1/2004 Krywiczanin et al.
2004/0133983 A1 7/2004 Newkirk
2005/0181917 A1 8/2005 Dayal
2006/0037141 A1 2/2006 Krywiczanin et al.
2006/0123546 A1 6/2006 Horton
2006/0162076 A1 7/2006 Bartlett et al.
2006/0162084 A1 * 7/2006 Mezue .................. A47C 27/10 5/706
2008/0134434 A1 6/2008 Celauro
2009/0139030 A1 * 6/2009 Yang ...................... A61G 13/10 5/619
2010/0037397 A1 2/2010 Wood
2010/0192300 A1 8/2010 Tannoury
2010/0319121 A1 * 12/2010 Polomsky ............ A61G 7/1076 5/81.1 RP
2011/0030702 A1 2/2011 Czajka, Jr.
2011/0099716 A1 5/2011 Jackson
2012/0144589 A1 6/2012 Skripps et al.
2012/0255122 A1 10/2012 Diel et al.
2013/0111666 A1 5/2013 Jackson
2013/0283526 A1 10/2013 Gagliardi
2013/0307298 A1 11/2013 Meiki
2014/0068861 A1 3/2014 Jackson
2014/0109316 A1 4/2014 Jackson et al.
2014/0137327 A1 5/2014 Tannoury et al.
2015/0044956 A1 2/2015 Hacker
2015/0272681 A1 10/2015 Skripps et al.
2016/0081582 A1 * 3/2016 Rapoport ............... G01R 33/30 600/415

(56) References Cited

U.S. PATENT DOCUMENTS

| | | | | |
|---|---|---|---|---|
| 2016/0089287 | A1 | 3/2016 | Buerstner | |
| 2016/0193098 | A1 | 7/2016 | Nichols | |
| 2016/0193099 | A1 | 7/2016 | Drake | |
| 2016/0287236 | A1 | 10/2016 | Garcia-Bengochea | |
| 2017/0027797 | A1 | 2/2017 | Dolliver et al. | |
| 2017/0049651 | A1 | 2/2017 | Lim | |
| 2017/0049653 | A1 | 2/2017 | Lim | |
| 2017/0079864 | A1* | 3/2017 | Riley | A61G 13/123 |
| 2017/0112698 | A1 | 4/2017 | Hight et al. | |
| 2017/0135891 | A1* | 5/2017 | Kettner | A61B 6/0421 |
| 2017/0341232 | A1 | 11/2017 | Perplies | |
| 2018/0116891 | A1 | 5/2018 | Beale et al. | |
| 2018/0185228 | A1 | 7/2018 | Catacchio et al. | |
| 2018/0193104 | A1 | 7/2018 | Beale et al. | |
| 2018/0363596 | A1 | 12/2018 | Lim et al. | |
| 2019/0000702 | A1 | 1/2019 | Lim et al. | |
| 2019/0000707 | A1 | 1/2019 | Lim et al. | |
| 2019/0046381 | A1 | 2/2019 | Lim et al. | |
| 2019/0046383 | A1 | 2/2019 | Lim et al. | |
| 2019/0209409 | A1 | 7/2019 | Jackson et al. | |
| 2020/0000668 | A1 | 1/2020 | Lim et al. | |
| 2020/0060913 | A1 | 2/2020 | Lim et al. | |
| 2020/0060914 | A1 | 2/2020 | Lim et al. | |
| 2020/0060915 | A1 | 2/2020 | Lim et al. | |
| 2020/0138659 | A1 | 7/2020 | Lim et al. | |

FOREIGN PATENT DOCUMENTS

| | | |
|---|---|---|
| CN | 103298440 A | 9/2013 |
| CN | 204744223 | 11/2015 |
| JP | 2012-228509 | 11/2012 |
| JP | 2018069048 | 5/2018 |
| WO | WO03/077820 | 9/2003 |
| WO | 2007058673 | 5/2007 |
| WO | WO2009/062545 | 5/2009 |
| WO | WO2009/076483 | 6/2009 |
| WO | WO2014/028288 | 2/2014 |
| WO | 2017031225 | 2/2017 |
| WO | 2017139548 | 8/2017 |

OTHER PUBLICATIONS

Office Action from corresponding Japanese Application No. 2018-556265; Office Action dated Jan. 28, 2020.

Examination Report dated Apr. 8, 2020 from Australian Application No. 2016308175.

Office Action and Search Report dated Aug. 27, 2019 for corresponding Chinese application No. 201680046857.4.

Second Office Action dated Mar. 24, 2020 from Chinese Application No. 201680046857.4.

Office Action dated Dec. 17, 2019 for corresponding Japanese Application No. 2018-504646 with English translation.

Office Action dated Jun. 2, 2020 for corresponding Japanese application No. 2018-566265 with English translation.

International Search Report and Written Opinion dated Dec. 4, 2019 from International Application No. PCT/US2019/046979.

Extended European Search Report dated May 7, 2020 from European Application No. 17863886.2.

Office Action dated Sep. 11, 2020 from Chinese Application No. 201780066711.0.

International Search Report and Written Opinion dated Feb. 4, 2018 from International Application No. PCT/US2017/058180.

* cited by examiner

SURGICAL TABLE AND METHOD FOR USE THEREOF

CROSS-REFERENCES TO RELATED APPLICATIONS

The present application is a continuation of U.S. application Ser. No. 15/337,157, filed Oct. 28, 2016; all of which is hereby incorporated by reference in its entirety.

BACKGROUND OF THE INVENTION

Field of the Invention

The present invention relates to a surgical frame for supporting a patient during surgery. The surgical frame includes components that can be adjusted to facilitate positioning and repositioning of a patient during surgery and/or to accommodate differently sized patients. The components of the surgical frame are configured to afford supported movement of a patient during surgery, and afford changing of the position of the spine of the patient.

Description of the Prior Art

Traditionally, it has been difficult to articulate the bodies of patients during surgery. It is inherently difficult to position and reposition a patient under general anesthesia. To illustrate, multiple operating room personnel may be required to facilitate the positioning and repositioning of the patient to, for example, manipulate the spine of the patient. Furthermore, for example, multiple operating room personnel may be required to position a patient to afford a first spine position, and thereafter, repositioning the patient to afford a second spine position may again require multiple operating room personnel.

Given the inherent difficulty in moving a patient during surgery, there exists a need for a surgical frame for supporting a patient thereon that affords positioning and repositioning of the patient to afford multiple surgical approaches.

SUMMARY OF THE INVENTION

The present invention contemplates a surgical table including a sagittal adjustment device for manipulating the position of a patient including a base portion including an upper surface, and the base portion spacing the sagittal adjustment device from the ground, and the sagittal adjustment device including a first support portion and a second support portion, the first and second support portions being supported by and moveable over the upper surface of the base portion, the first and second support portions each including an upper surface, the upper surfaces of the first and second support portions being configured to support portions of the body of the patient thereon, one of the first and second support portions being pivotally attached to the base portion, the one of the first and second support portions being pivotally moveable between a first position and a second position, where pivotal movement between the first and second positions of the one of the first and second portions serves in repositioning the body of the patient to manipulate the spine of the patient.

The present invention further contemplates a surgical table including a sagittal adjustment device for manipulating the position of a patient including a base portion including an upper surface, and the base portion spacing the sagittal adjustment device from the ground, and the sagittal adjustment device including a first support portion and a second support portion, the first and second support portions being supported by and moveable over the upper surface of the base portion, the first and second support portions each including an upper surface, the upper surfaces of the first and second support portions being configured to support portions of the body of the patient thereon, one of the first and second support portions being pivotally attached to the base portion, the one of the first and second support portions being pivotally moveable between a first position and a second position, the other of the first and second support portions being moveable relative to the base portion, the other of the first and second support portions being moveable between at least a first position and a second position, where pivotal movement between the first and second positions of the one of the first and second portions and movement between the first and second position of the other of the first and second portions serve in repositioning the body of the patient to manipulate the spine of the patient.

A method of using a surgical table including a base portion and a sagittal adjustment device for adjusting positions of a patient thereon, the method including positioning a first portion of the patient in a first position on a first portion of the sagittal adjustment device, positioning a second portion of the patient in a second position on a second portion of the sagittal adjustment device, moving the first portion of the sagittal adjustment device relative to the base portion to move the first portion of the patient from the first position to a third position, moving the second portion of the sagittal adjustment device relative to the base portion to move the second portion of the patient from the second position to a fourth position, adjusting the first and second portions of the sagittal adjustment device relative to one another to adjust the first and second portions of the patient relative to one another and manipulate the spine of the patient.

These and other objects of the present invention will be apparent from review of the following specification and the accompanying drawings.

DETAILED DESCRIPTION OF THE PREFERRED EMBODIMENT

Figure 1:
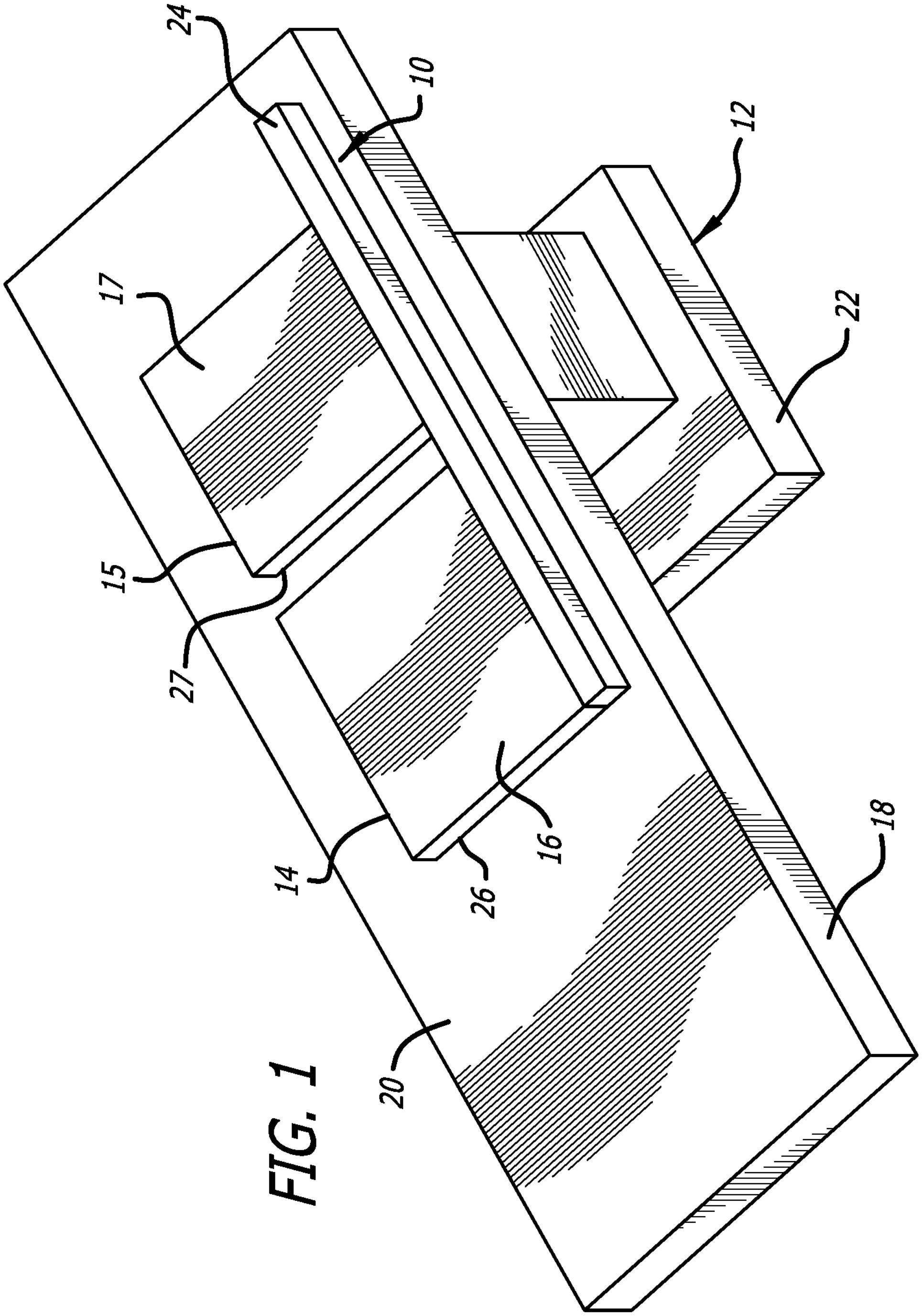
FIG. 1 is a top perspective view of a surgical table.

A tabletop sagittal adjustment device is generally indicated by the numeral 10 in FIGS. 1-8. The adjustment device 10 can be integrated with a surgical table 12, and the adjustment device 10 can be manipulated during surgery to adjust the position of a patient P thereon. In doing so, the adjustment device 10 can be used to alter the position of the patient P before and during surgery to, for example, manipulate the spine of the patient. To illustrate, the adjustment device 10 can be used to facilitate changing of the spinal alignment of the patient P. Furthermore, for example, altering the position of the patient can be used to accommodate different surgical pathways to the spine of the patient P. Thus, before and during surgery, the adjustment device 10 can be used to position the patient P in a first position, and then the adjustment device 10 can be used to reposition the patient P in a different position via manipulation of the adjustment device 10.

The adjustment device 10 includes a first patient support portion 14 and a second patient support portion 15 positioned on top of a base plate 18 of the surgical table 12. The first and second patient support portions 14 and 15 are provided over an upper surface 20 of the base plate 18, and the base plate 18 and the upper surface 20 thereof are spaced apart from the ground by a base portion 22 thereof. The upper surface 20 can be spaced from the ground at a height to accommodate performance of surgery on the patient P.

The first and second support portions 14 and 15 can have various shapes to accommodate positioning portions of the body of the patient P thereon. As depicted in FIGS. 1-8, for example, the first and second support portions 14 and 15 are generally rectangular, and include upper surfaces 16 and 17, respectively, for supporting the patient P thereon.

Figure 2:
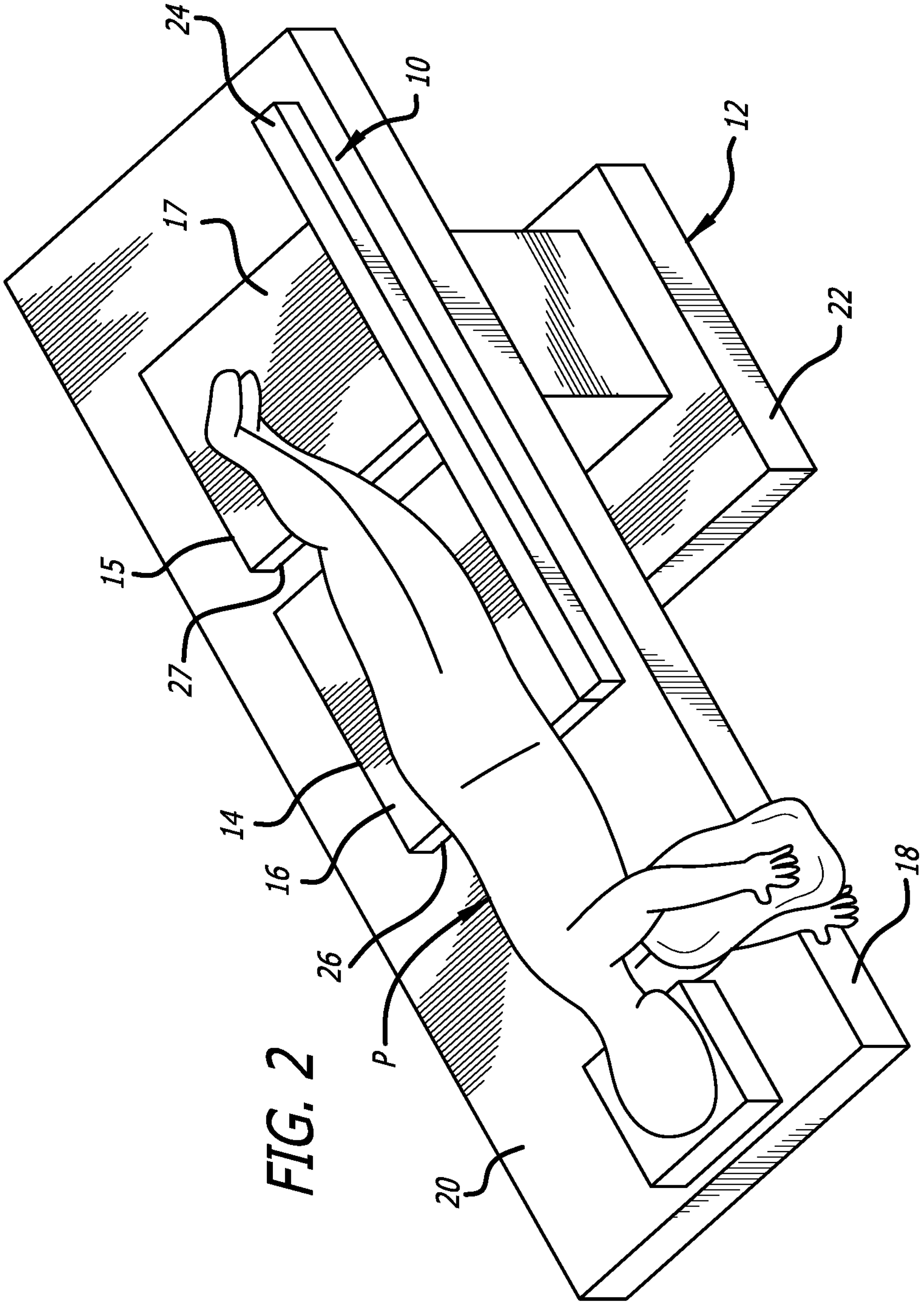
FIG. 2 is a top perspective view of the surgical table of FIG. 1 showing a patient positioned thereon in a first position.
Figure 3:
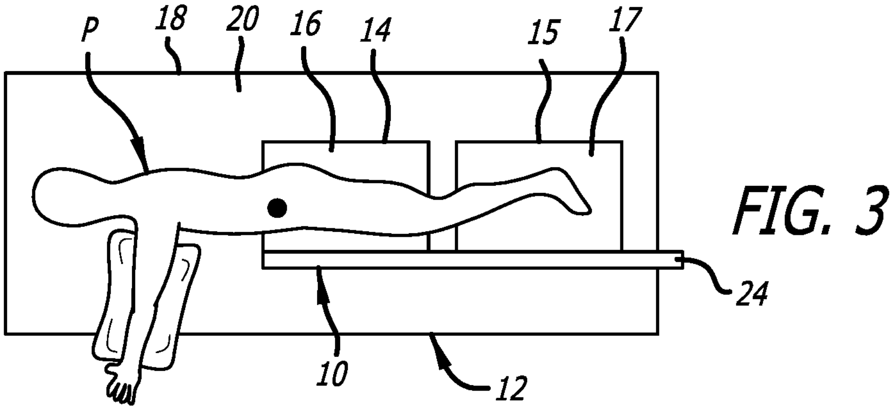
FIG. 3 is a top plan view of the surgical table of FIG. 1 showing the patient positioned thereon in the first position.
Figure 4:
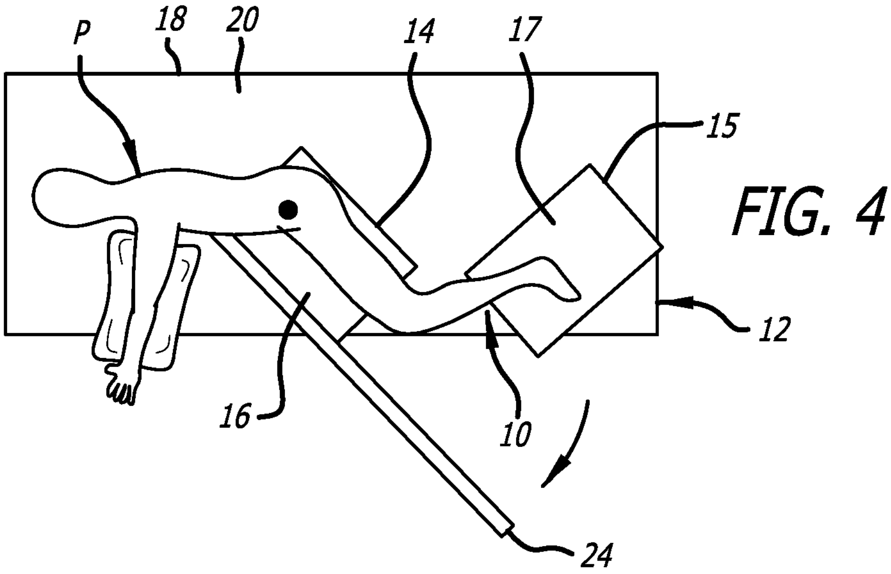
FIG. 4 is a top plan view of the surgical table of FIG. 1 showing the patient positioned thereon in a second position.
Figure 5:
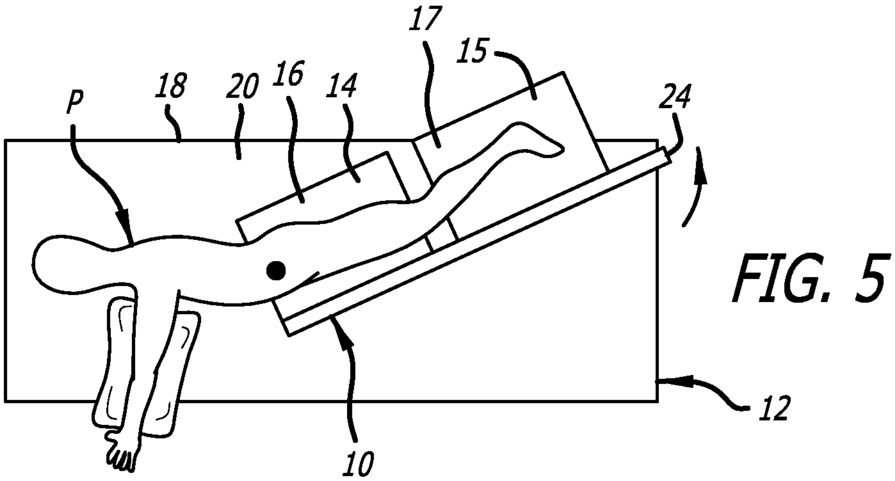
FIG. 5 is a top plan view of the surgical table of FIG. 1 showing the patient positioned thereon in a third position.

The patient P, as depicted in FIGS. 2-5, is positioned on the upper surfaces 16 and 17 of the first and second patient support portions 14 and 15, respectively, in a lateral position. As discussed below, the first and second patient support portions 14 and 15 are supported by and moveable over the upper surface 20 of the base plate 18. Thus, using the first and second support portions 14 and 15, the patient P can be positioned and repositioned before and during surgery. In doing so, the patient P can be positioned in various lateral positions to, for example, manipulate the spine of the patient P and/or adjust the surgical pathways to the patient's spine. To illustrate, FIGS. 2 and 3 shows the patient P in a lateral position with the patient's legs straightened to facilitate lordosis in the patient's spine, FIG. 4 shows the patient P in a lateral position manipulated to apply kyphosis to the patient's lumbar spine, and FIG. 5 shows the patient P in a lateral position manipulated to apply additional lordosis to the patient's lumbar spine.

A handle 24 can be attached to one of first and second patient support portions 14 and 15 to facilitate movement of at least one of the first and second patient support portions 14 and 15. As depicted in FIGS. 1-8, for example, the handle 24 is attached to the first support portion 14. As discussed below, the handle 24 serves as a lever arm facilitating repositioning of at least the first support portion 14. Additionally, lower surfaces 26 and 27 of the first and second support portions 14 and 15 can be provided with omnidirectional movement mechanisms. For example, the lower surfaces 26 and 27 can include omnidirectional casters or rollers (not shown) that afford movement of the first and second support portions 14 and 15 in any direction on the upper surface 20 of the base plate 18.

Figure 6:
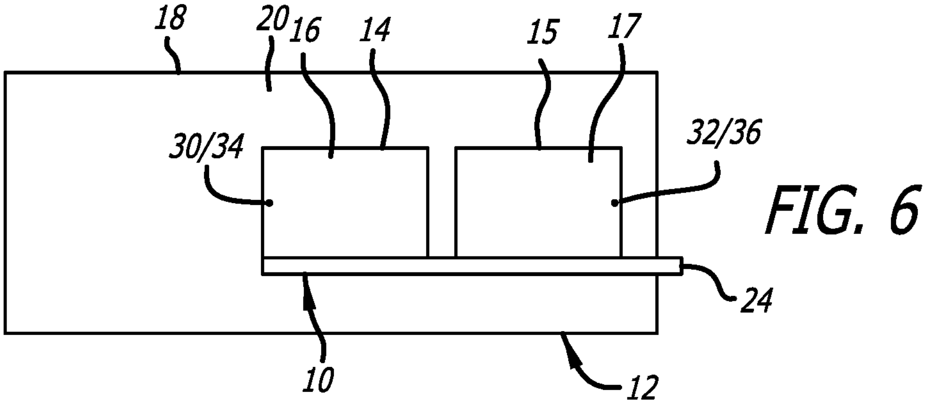
FIG. 6 is a top plan view of the surgical table of FIG. 1 showing first and second support portions in a first position, at least the first support portion being pinned to the table to afford constrained movement thereof.
Figure 7:
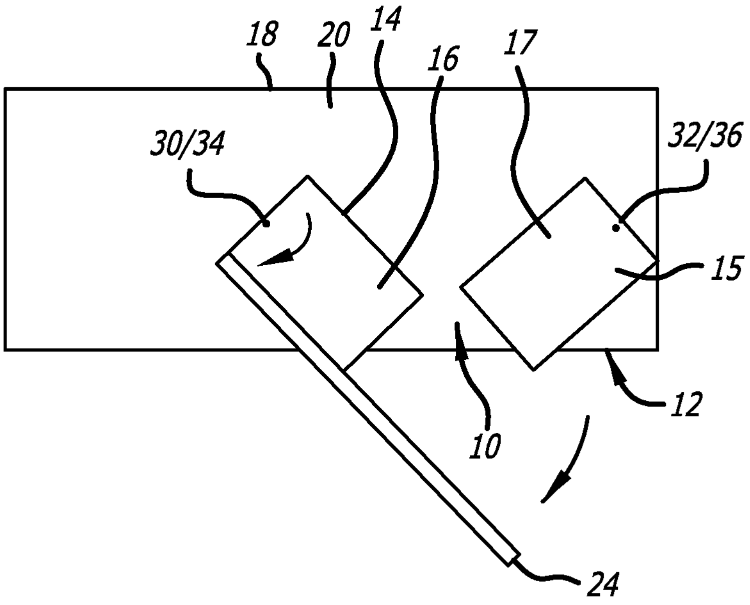
FIG. 7 is a top plan view of the surgical table of FIG. 1 showing the first and second support portions in a second position.
Figure 8:
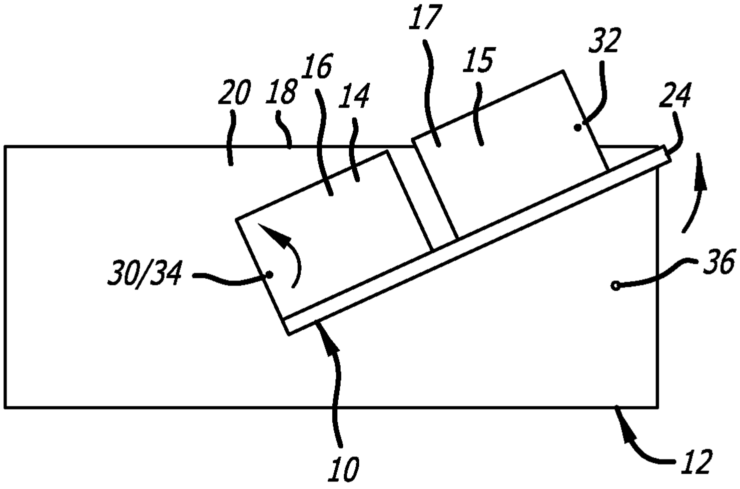
FIG. 8 is a top plan view of the surgical table of FIG. 1 showing the first and second support portions in a third position.

As discussed above, the first and second support portions 14 and 15 are supported by and moveable over the upper surface 20 of the base plate 18. Furthermore, at least one of the first and second support portions 14 and 15 can be moveably attached to the base plate 18. For example, as depicted in FIGS. 6-8, the first support portion 14 and the second support portion 15 are pivotally attached to the base plate 18 by pins 30 and 32, respectively. The pins 30 and 32 are received through holes in the first and second support portions 14 and 15, and removably inserted into holes 34 and 36 provided in the base plate 18. By pinning the first and second support portions 14 and 15 to the base plate 18, the first and second support portions 14 and 15 can pivot about the pins 30 and 32, respectively, to afford the movement depicted in FIGS. 1-8. The holes 34 and 36 are sized to afford constrained movement of the pins 30 and 32 relative thereto, and thus, provide fixed pivot points for the first and second support portions 14 and 15, and the handle 24 can be used in pivoting the first support portion 14, as depicted in FIGS. 7 and 8. Furthermore, the first and second support portions 14 and 15 can be unpinned from the base plate 18 to facilitate unconstrained movement thereof on the upper surface 20.

Figure 9:
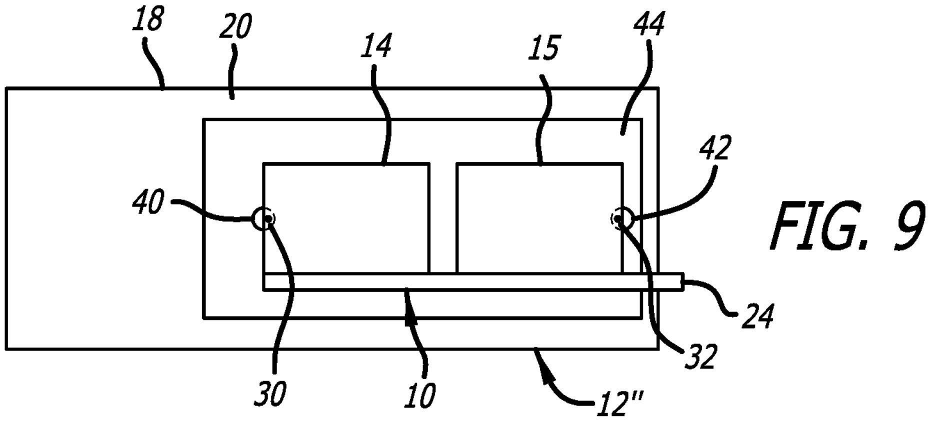
FIG. 9 is a top plan view of another embodiment of a surgical table showing first and second support portions in a first position, at least the first support portion being pinned to the table to afford semi-constrained movement thereof.
Figure 10:
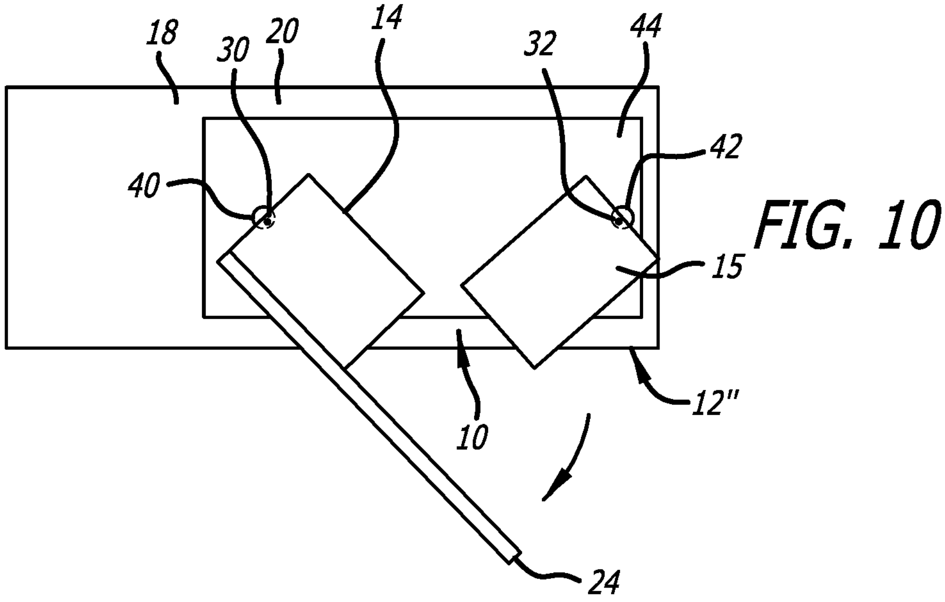
FIG. 10 is a top plan view of the surgical table of FIG. 9 showing the first and second support portions in a second position.
Figure 11:
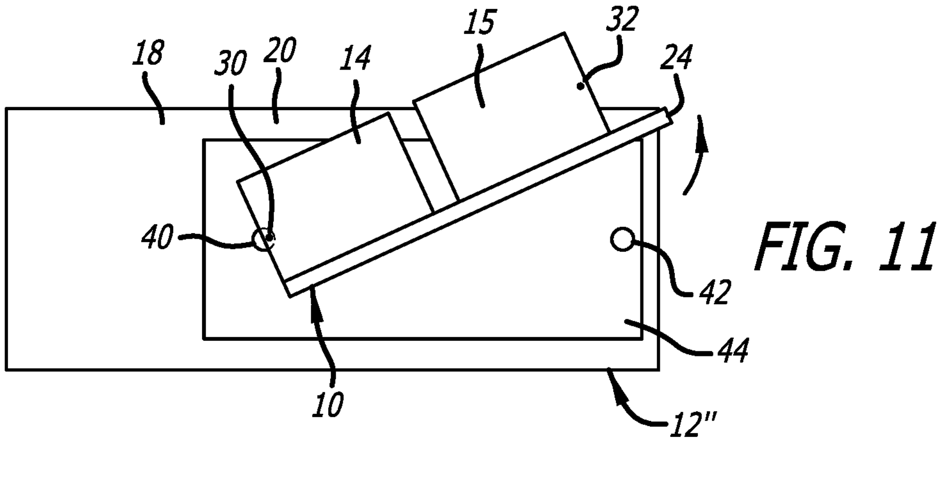
FIG. 11 is a top plan view of the surgical table of FIG. 9 showing the first and second support portions in a third position.

FIGS. 9-11 depict another embodiment of the surgical table generally referenced by the numeral 12'. The surgical table 12' also includes first and second support portions 14 and 15 of the adjustment device 10, and the first and second support portions 14 and 15, as depicted in FIGS. 9-11, are pinned to the base plate 18 using larger holes 40 and 42. The holes 40 and 42 can be formed in the base plate 18 or a second base plate 44 positioned between the base plate 18 and the first and second support portions 14 and 15. The second base plate 18 can also be used with the surgical tables 12 and 12". The holes 40 and 42 are sized to receive and afford semi-constrained movement of the pins 30 and 32 relative thereto, and thus, provide variable pivot points for the first and second support portions 14 and 15. Again, the handle 24 can be used in pivoting the first support portion 14, as depicted in FIGS. 10 and 11, and the first and second support portions 14 and 15 can be unpinned from the base plate 18 to facilitate unconstrained movement thereof on the upper surface 20.

Figure 12:
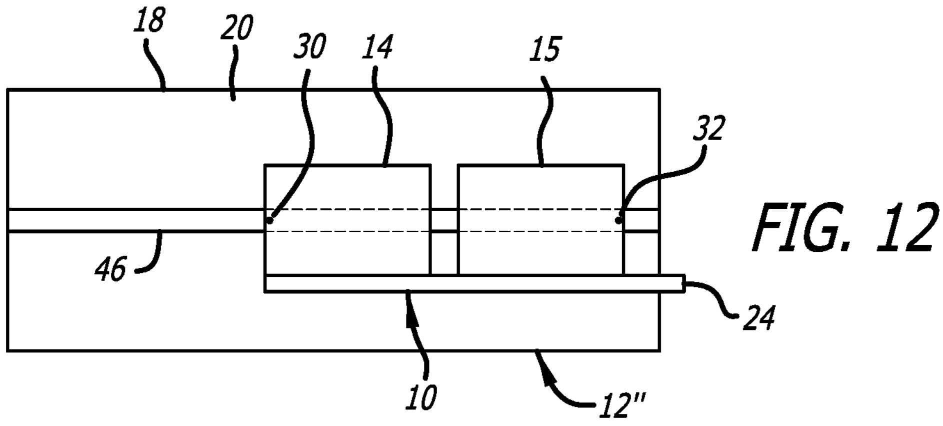
FIG. 12 is a top plan view of another embodiment of a surgical table showing first and second support portions in a first position, at least the first support portion being pinned to the table to afford semi-constrained movement thereof.
Figure 13:
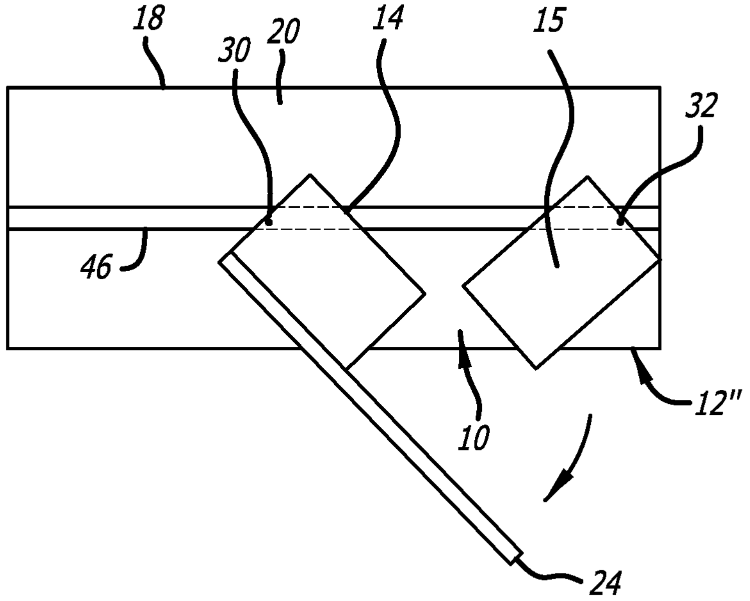
FIG. 13 is a top plan view of the surgical table of FIG. 12 showing the first and second support portions in a second position.
Figure 14:
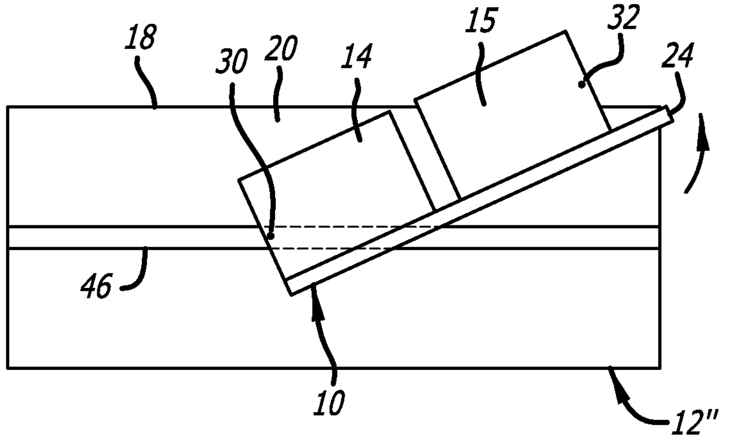
FIG. 14 is a top plan view of the surgical table of FIG. 12 showing the first and second support portions in a third position.

FIGS. 12-14 depict another embodiment of the surgical table generally referenced by the numeral 12". The surgical table 12" also includes first and second support portions 14 and 15 of the adjustment device, and the first and second support portions 14 and 15, as depicted in FIGS. 12-14, are pinned to the base plate 18 using a channel 46. The channel 46 is sized to receive and afford semi-constrained movement of the pins 30 and 32 relative thereto, and thus, provide variable pivot points for the first and second support portions 14 and 15. Again, the handle 24 can be used in pivoting the first support portion 14, as depicted in FIGS. 13 and 14, and the first and second support portions 14 and 15 can be unpinned from the base plate 18 to facilitate unconstrained movement thereof on the upper surface 20.

Additionally, in each of the embodiments of the surgical table 12, 12', and 12", the first and second support portions 14 and 15 can be provided with locking mechanisms for restraining movement of the first and second support portions 14 and 15 after positions therefor have been selected. Furthermore, the upper surfaces 16 and 17 of the first and second support portions 14 and 15 of each of the embodiments of the surgical table 12, 12', and 12" can provided with cushioning to provide relatively soft surfaces for supporting the patient P. For example, the cushioning can be integrated with the upper surfaces 16 and 17, and/or the first and second support portions 14 and 15 can be provided with attachment points to which removable cushioning can be attached. Either way, each of the embodiments of the surgical tables 12, 12', and 12" can be provided with relatively soft surfaces for supporting the patient P thereon.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A surgical table including a sagittal adjustment device for manipulating the position of a patient comprising:

a base portion including an upper surface and a channel formed in the upper surface; and the sagittal adjustment device including a first support portion and a second support portion supported by the upper surface of the base portion, the first and second support portions being moveable over the upper surface of the base portion, the first and second support portions each including an upper surface, the first support portion including a first edge portion, the second support portion including a second edge portion, the first edge portion of the first support portion and the second edge portion of the second support portion facing one another and having an uninterrupted space therebetween, the first support portion being pivotally attached to the base portion, and being moveable between a first pivotal position and a second pivotal position relative to the base portion, and the second portion being pivotally attached to the base portion, and being moveable between a third pivotal position and a fourth pivotal position relative to the base portion;

wherein the first support portion is configured to support at least a first portion of the patient thereon, and the second support portion is configured to support at least a second portion of the patient thereon, wherein, when the first support portion is in the first pivotal position and the second support portion is in the third pivotal position, the first edge portion and the second edge portion are substantially parallel to one another, and, when the first support portion is in the second pivotal position and the second support portion is in the fourth pivotal position, the first edge portion and the second edge portion have an acute orientation with respect to one another, and wherein the channel of the base portion extends in a direction substantially aligned with a mid-longitudinal axis of the base portion, and wherein a pin is one of received in an aperture formed in the base portion, and received in the channel to constrain movement of the second support portion relative to the base portion, the second support portion being pivotally moveable relative to the upper surface of the base portion when the pin is received in the aperture, and the second support portion being pivotally moveable and linearly moveable relative to the upper surface of the base portion when the pin is received in the channel.

2. The surgical table of claim 1, wherein the first support portion and the second support portion each include a mid-longitudinal axis, and wherein pivotal movement between the first and second pivotal positions of the first support portion serves to reposition a first portion of the patient to manipulate the spine of the patient, and reposition the mid-longitudinal axis of the first support portion to be transverse to the mid-longitudinal axis of the base portion.

3. The surgical table of claim 2, wherein pivotal movement between the third and fourth pivotal positions of the second support portion serves to reposition a second portion of the patient to manipulate the spine of the patient, and reposition the mid-longitudinal axis of the second support portion to be transverse to the mid-longitudinal axes of the base portion and the first support portion.

4. The surgical table of claim 3, wherein the first portion of the patient corresponds to at least portions of hips and upper legs of the patient, and the second portion of the patient corresponds to at least portions of the lower legs of the patient.

5. The surgical table of claim 1, further comprising omni-directional casters provided on the lower surfaces of the first and second support portions to facilitate movement of the first and second support portions along the upper surface of the base portion.

6. The surgical table of claim 1, wherein the pin includes a diameter, and the size of the aperture for receiving the pin approximates the diameter of the pin to afford constrained pivotal movement of the second support portion relative to the base portion.

7. The surgical table of claim 1, wherein the pin includes a diameter, and the size of the aperture for receiving the pin is larger than the diameter of the pin to afford semi-constrained pivotal movement of the second support portion relative to the base portion.

8. The surgical table of claim 1, further comprising a handle portion attached to at least one of the first and second support portions, the handle affording manipulation of the at least one of the first and second support portions relative to the base portion.

9. A surgical table including a sagittal adjustment device for manipulating the position of a patient comprising:

a base portion including an upper surface and a channel formed in the upper surface; and the sagittal adjustment device including a first support portion and a second support portion supported by the upper surface of the base portion, the first and second support portions being moveable over the upper surface of the base portion, the first and second support portions each including a lower surface moveable over the upper surface of the base portion via omni-directional casters provided on the lower surfaces of the first and second support portions, the first support portion including a first edge portion, the second support portion including a second edge portion, the first edge portion of the first support portion and the second edge portion of the second support portion facing one another, the first support portion being pivotally attached to the base portion, and being moveable between a first pivotal position and a second pivotal position relative to the base portion, and the second support portion being pivotally attached to the base portion, and being moveable between a third pivotal position and a fourth pivotal position relative to the base portion;

wherein, when the first support portion is in the first pivotal position and the second support portion is in the third pivotal position, the first edge portion and the second edge portion are substantially parallel to one another, and, when the first support portion is in the second pivotal position and the second support portion is in the fourth pivotal position, the first edge portion and the second edge portion have an acute orientation with respect to one another, wherein the channel of the base portion extends in a direction substantially aligned with a mid-longitudinal axis of the base portion, and wherein a pin is one of received in an aperture formed in the base portion, and received in the channel to constrain movement of the second support portion relative to the base portion, the second support portion being pivotally moveable relative to the upper surface of the base portion when the pin is received in the aperture, and the second support portion being pivotally moveable and linearly moveable relative to the upper surface of the base portion when the pin is received in the channel.

10. The surgical table of claim 9, wherein the first support portion and the second support portion each include a mid-longitudinal axis, and wherein pivotal movement between the first and second pivotal positions of the first support portion serves to reposition a first portion of the patient to manipulate the spine of the patient, and reposition the mid-longitudinal axis of the first support portion to be transverse to the mid-longitudinal axis of the base portion.

11. The surgical table of claim 10, wherein pivotal movement between the third and fourth pivotal positions of the second support portion serves to reposition a second portion of the patient to manipulate the spine of the patient, and reposition the mid-longitudinal axis of the second support portion to be transverse to the mid-longitudinal axes of the base portion and the first support portion.

12. The surgical table of claim 11, wherein the first portion of the patient corresponds to at least portions of hips and upper legs of the patient, and the second portion of the patient corresponds to at least portions of the lower legs of the patient.

13. The surgical table of claim 9, wherein the pin includes a diameter, and the size of the aperture for receiving the pin approximates the diameter of the pin to afford constrained pivotal movement of the second support portion relative to the base portion.

14. The surgical table of claim 9, wherein the pin includes a diameter, and the size of the aperture for receiving the pin is larger than the diameter of the pin to afford semi-constrained pivotal movement of the second support portion relative to the base portion.

15. A method of using a surgical table including a base portion and a sagittal adjustment device for adjusting positions of a patient thereon, the method comprising:

providing a first pivotal portion and a second pivotal portion of the sagittal adjustment device supported by an upper surface of the base portion, each of the first pivotal portion and the second pivotal portion being pivotally attached to the base portion, the first pivotal portion having a first edge, the second pivotal portion having a second edge, and the first edge of the first pivotal portion and the second edge of the second pivotal portion facing one another;

positioning a first portion of the patient in a first position on the first pivotal portion of the sagittal adjustment device;

positioning a second portion of the patient in a second position on the second pivotal portion of the sagittal adjustment device;

pivoting the first pivotal portion of the sagittal adjustment device relative to the upper surface of the base portion between at least a first pivotal position and a second pivotal position thereof to move the first portion of the patient from the first position to a third position;

pivoting the second pivotal portion of the sagittal adjustment device relative to the upper surface of the base portion between at least a third pivotal position and a fourth pivotal position thereof to move the second portion of the patient from the second position to a fourth position;

further adjusting the first and second pivotal portions of the sagittal adjustment device relative to one another to adjust the first and second portions of the patient relative to one another and manipulate the spine of the patient; and moving one of the first and second portions linearly relative to the base portion to further adjust the first and second portion of the patient relative to one another;

wherein, when the first pivotal portion of the sagittal adjustment device is in the first pivotal position and the second pivotal portion of the sagittal adjustment device is in the third pivotal position, the first edge and the second are substantially parallel to one another, and, when the first pivotal portion of the sagittal adjustment device is in the second pivotal position and the second pivotal portion of the sagittal adjustment device is in the fourth pivotal position, the first edge and the second edge have an acute orientation with respect to one another, and wherein the one of the first and second portions is linearly moveable by moving a first pin along a channel formed in the upper surface that extends in a direction substantially aligned with the mid-longitudinal axis of the base portion.

16. The method of claim 15, wherein omni-directional casters are provided on the lower surfaces of the first and second support portions to facilitate movement of the first and second support portions along the upper surface of the base portion.

17. The method of claim 15, wherein the other of the first and second portions is selectively pinned to the base portion using a second pin.

18. The method of claim 17, wherein the second pin includes a diameter, and the size of a first aperture in the base portion for receiving the second pin approximates the diameter of the second pin to afford constrained pivotal movement of the other of the first and second portions.

19. The method of claim 17, wherein the second pin includes a diameter, and the size of the first aperture in the base portion for receiving the second pin is larger than the diameter of the second pin to afford semi-constrained pivotal movement of the other of the first and second portions.

20. The surgical table of claim 15, wherein the first portion of the patient corresponds to at least portions of hips and upper legs of the patient, and the second portion of the patient corresponds to at least portions of the lower legs of the patient.

* * * * *